United States Patent
Inao et al.

(10) Patent No.: US 9,490,051 B2
(45) Date of Patent: Nov. 8, 2016

(54) METHOD FOR PRODUCING WIRE HARNESS

(71) Applicant: Yazaki Corporation, Tokyo (JP)

(72) Inventors: Shinichi Inao, Makinohara (JP);
Hideomi Adachi, Makinohara (JP);
Takeshi Ogue, Makinohara (JP);
Tatsuya Oga, Makinohara (JP);
Hiroyuki Yoshida, Makinohara (JP);
Masaaki Suguro, Makinohara (JP);
Yoshiaki Ozaki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/629,767

(22) Filed: Feb. 24, 2015

(65) Prior Publication Data
US 2015/0187469 A1   Jul. 2, 2015

Related U.S. Application Data

(63) Continuation of application No. PCT/JP2013/075531, filed on Sep. 20, 2013.

(30) Foreign Application Priority Data

Sep. 26, 2012 (JP) ................. 2012-211735

(51) Int. Cl.
*H01B 13/012* (2006.01)
*H02G 3/04* (2006.01)
*B60R 16/02* (2006.01)
(Continued)

(52) U.S. Cl.
CPC ......... *H01B 13/012* (2013.01); *B60R 16/0215* (2013.01); *H02G 3/0481* (2013.01); *H01R 9/032* (2013.01); *H02G 1/14* (2013.01); *H02G 3/06* (2013.01); *Y10T 29/49185* (2015.01)

(58) Field of Classification Search
CPC ...... H01B 13/012; H01R 9/032; H02G 1/14; H02G 3/0481
See application file for complete search history.

(56) References Cited

U.S. PATENT DOCUMENTS

| 4,036,101 A | 7/1977 | Burnett |
| 6,583,352 B2 * | 6/2003 | Fukushima ............ H01R 9/032 174/373 |

(Continued)

FOREIGN PATENT DOCUMENTS

| CN | 101404370 A | 4/2009 |
| CN | 101794644 A | 8/2010 |

(Continued)

OTHER PUBLICATIONS

Preliminary Report (PCT/IB/373) dated Mar. 31, 2015, attached with Written Opinion (PCT/ISA/237) issued by the International Searching Authority in counterpart International Application No. PCT/JP2013/075531.

(Continued)

*Primary Examiner* — Minh Trinh
(74) *Attorney, Agent, or Firm* — Sughrue Mion, PLLC

(57) ABSTRACT

Disclosed is a method for producing a wire harness including a core inserting step of forming a widely open braided mesh portion by widening a braided mesh of a braid before crimping is performed, and of inserting a core into an end from the outside of the braid via the widely open braided mesh portion.

5 Claims, 6 Drawing Sheets

(51) Int. Cl.
*H02G 1/14* (2006.01)
*H02G 3/06* (2006.01)
*H01R 9/03* (2006.01)

(56) References Cited

U.S. PATENT DOCUMENTS

| | | | |
|---|---|---|---|
| 7,094,970 B2* | 8/2006 | Kihira | B60L 11/1803 174/74 R |
| 7,228,625 B1 | 6/2007 | Zerebilov | |
| 7,666,032 B2* | 2/2010 | Aoki | H01R 9/032 29/844 |
| 7,959,468 B2* | 6/2011 | Yong | H01R 13/648 439/607.41 |
| 8,803,006 B2* | 8/2014 | Imahori | H01R 9/032 174/539 |
| 2004/0099427 A1* | 5/2004 | Kihira | B60L 11/1803 174/359 |
| 2009/0093159 A1 | 4/2009 | Aoki et al. | |
| 2011/0236614 A1 | 9/2011 | Ushikai et al. | |

FOREIGN PATENT DOCUMENTS

| | | |
|---|---|---|
| CN | 102239615 A | 11/2011 |
| EP | 0481724 A2 | 4/1992 |
| JP | 2002-324627 A | 11/2002 |
| JP | 2004171952 A | 6/2004 |
| JP | 2006310474 A | 11/2006 |
| JP | 2008177120 A | 7/2008 |
| JP | 20100177080 A | 8/2010 |
| WO | 2006/126381 A1 | 11/2006 |

OTHER PUBLICATIONS

Written Opinion (PCT/ISA/237) issued Nov. 5, 2013; in related International Application No. PCT/JP2013/075531.
ISR (PCT/ISA/210) issued Nov. 5, 2013; in related International Application No. PCT/JP2013/075531.
Communication issued Jun. 24, 2016, issued by the European Patent Office in counterpart European Patent Application No. 13841354.7.
Office Action issued on Jul. 26, 2016, by the Japanese Patent Office in counterpart Japanese Application No. 2012-211735.
Communication dated Jul. 20, 2016, issued by the State Intellectual Property Office of P.R. China in counterpart Chinese application No. 201380050364.4.

* cited by examiner

//(1)

METHOD FOR PRODUCING WIRE HARNESS

CROSS REFERENCE TO RELATED APPLICATIONS

This application is a continuation of international patent application No. PCT/JP2013/075531, which was filed on Sep. 20, 2013 based on Japanese Patent Application No. 2012-211735 filed on Sep. 26, 2012, the contents of which are incorporated herein by reference.

BACKGROUND OF THE INVENTION

1. Field of the Invention

The present invention relates to a method for producing a wire harness.

2. Description of the Related Art

Typically, for example, a high-tension (that is, high-voltage) wire harness is used as a member that electrically connects a battery to an inverter unit in a hybrid vehicle or an electric vehicle. The wire harness for electrically connecting the battery to the inverter unit includes a plurality of high-tension conductive paths; an exterior member that has a tubular shape, accommodates and protects the high-tension conductive paths; and a braid that has a cylindrical shape, and covers the respective terminal portions of the conductive paths (hereinafter, referred to as conductive path terminal portions) which are externally led from the end of the exterior member.

Typically, the braid is fixed to the end of the exterior member via crimping. The braid is included as a member for shielding the conductive path terminal portions from electromagnetic waves (that is, shielding member). A wire harness disclosed in JP-A-2004-171952 is an example of the wire harness that includes such a braid.

SUMMARY OF THE INVENTION

When the conductive path terminal portions are led far from the end of the exterior member, the length of the braid covering the conductive path terminal portions is also set to be long. An end of the braid is fixed to the end of the exterior member via crimping. The insertion of a core into the end of the exterior member is required for a crimping operation. However, when the braid is long, it is difficult to insert the core from the other end of the braid. In particular, when the braid is long relative to an opening of the end of the exterior member in dimension, the crimping operation becomes difficult. For this reason, workability may be adversely affected.

The present invention is made in light of the problem, and a non-limited object of the present invention is to provide a method for producing a wire harness, by which it is possible to improve workability in the insertion of a core.

In order to achieve the above object, a method for producing a wire harness according to aspect of the present invention is configured as the following configurations (1) to (4).

(1) A method for producing a wire harness, wherein the wire harness includes:
  at least one conductive path;
  an exterior member, having a tubular shape, that accommodates and protects the conductive path; and
  a braid, having a cylindrical shape, that is fixed to an end of the exterior member via crimping, and covers a terminal portion of the conductive path which is externally led from the end, wherein the method for producing the wire harness comprises:
  a core inserting step of forming a widely open braided mesh portion by widening a braided mesh of the braid before the crimping is performed, and inserting a core inside the end from an outside of the braid through the widely open braided mesh portion.

(2) The method for producing the wire harness according to the configuration (1), wherein, the braid is a long braid formed to have a long total length relative to an opening of the end in dimension.

(3) The method for producing the wire harness according to the configuration (1) or (2), wherein, in the core insertion step, the widely open braided mesh portion is formed by widening the braided mesh close to the end.

(4) The method for producing the wire harness according to any one of the configurations (1) to (3), wherein, during the core insertion step, an insertion side of the core, on which a convexity is formed, is inserted to the widely open braided mesh portion.

According the method for producing the wire harness in the configuration (1) above, since the widely open braided mesh portion is formed by widening the braided mesh of the braid, and the core is inserted into the end of the exterior member from the outside of the braid through the widely open braided mesh portion, it is possible to improve workability in the insertion of the core compared to the related art.

According to the method for producing the wire harness in the configuration (2) above, even though the braid is long, it is possible to improve workability in the insertion of the core.

According to the method for producing the wire harness in the configuration (3) above, since the widely open braided mesh portion is formed close to the end of the exterior member, it is possible to decrease an insertion distance of the core. For this reason, it is possible to much more easily insert the core.

According to the method for producing the wire harness in the configuration (4) above, since the insertion side of the core, on which the convexity is formed, is inserted, it is possible to smoothly insert the core through the widely open braided mesh portion. For this reason, it is possible to much more easily insert the core.

DETAILED DESCRIPTION OF THE EXEMPLARY EMBODIMENTS

Roughly describing, in a method for producing a wire harness according to an embodiment, when fixing an end of a braid to the end of an exterior member via crimping, instead of inserting a core from the other end of the braid, a widely open braided mesh portion is formed by widening braided meshes of the braid, and the core is inserted into the end of the exterior member from the outside of the braid through the widely open braided mesh portion.

Figure 1:
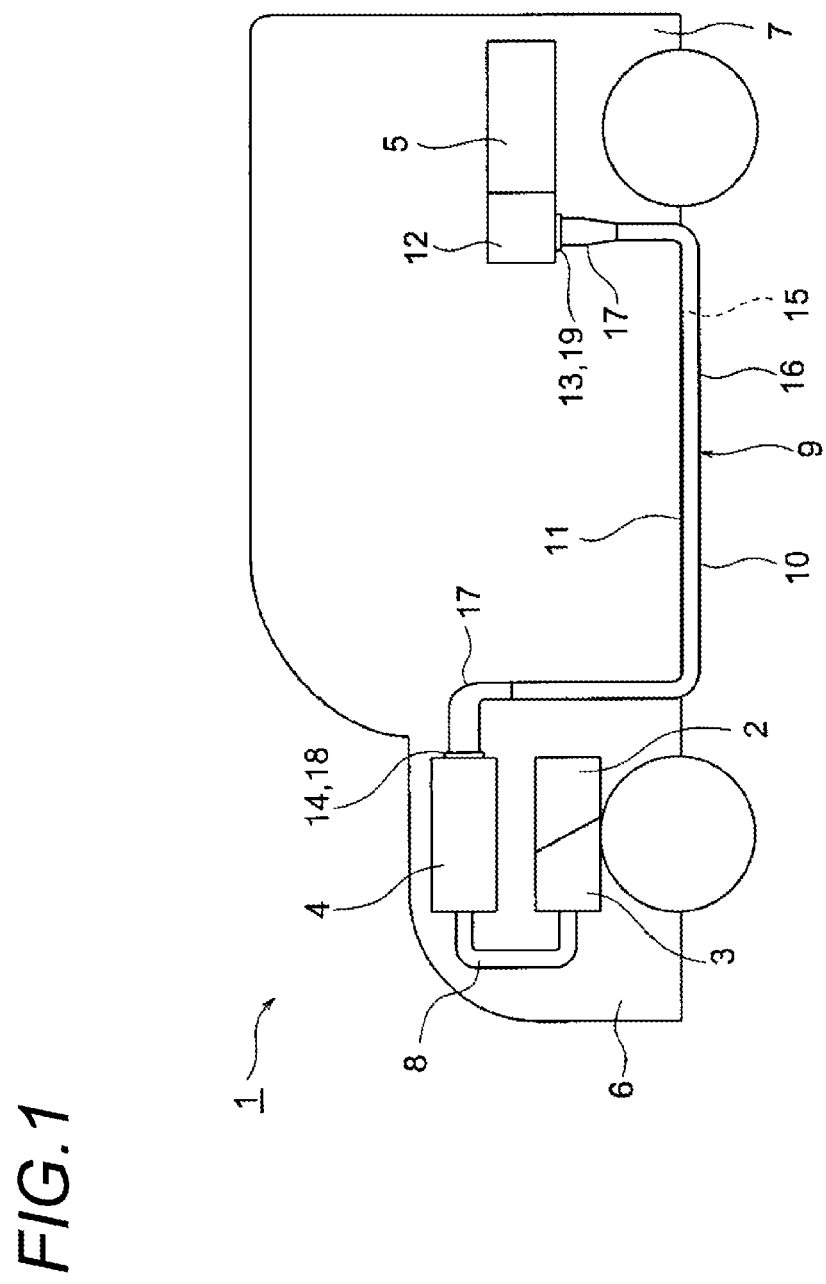
FIG. 1 is a schematic view illustrating routing of a wire harness.
Figure 2:
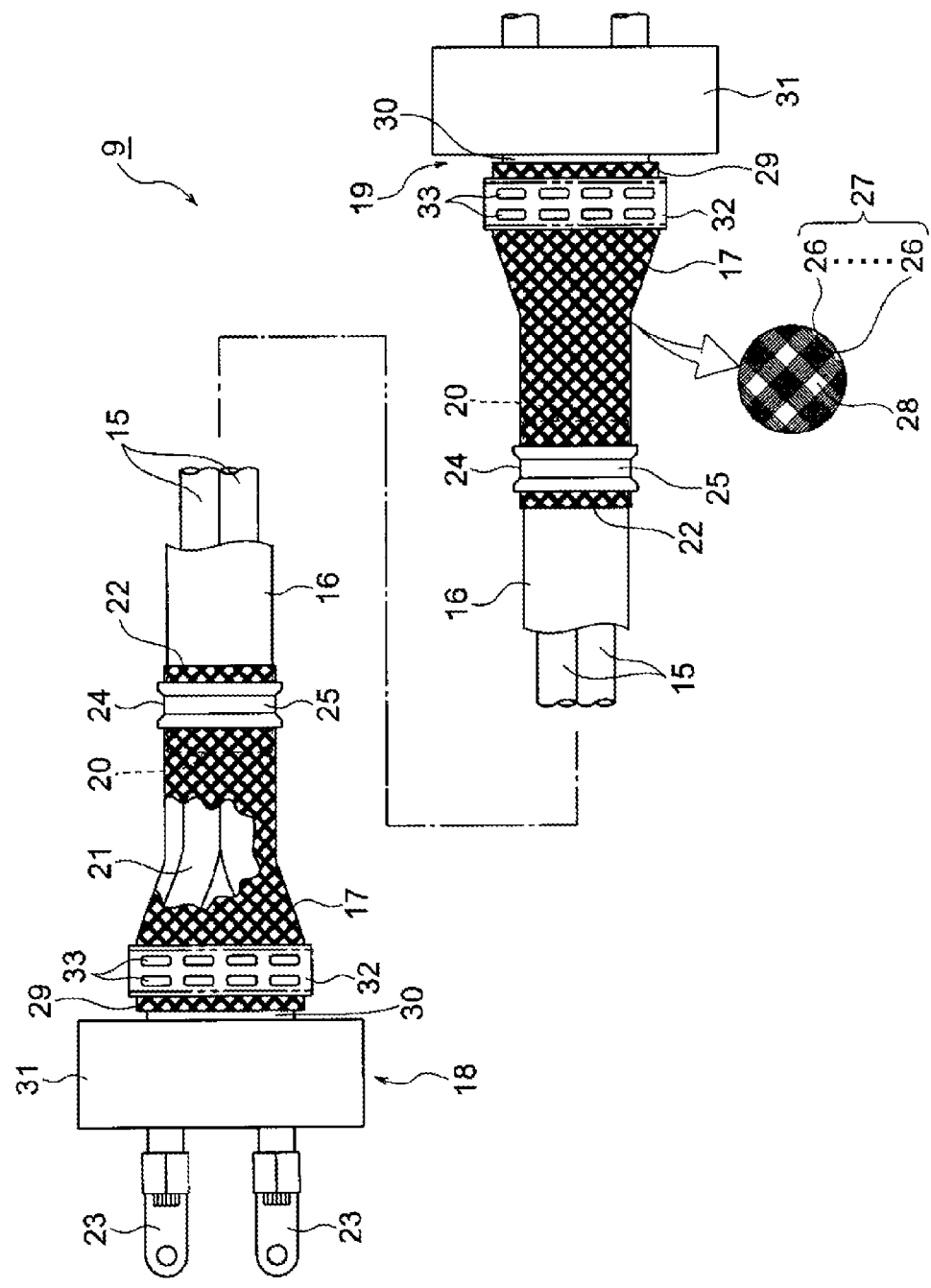
FIG. 2 is a diagram of the configuration of the wire harness in FIG. 1.
Figure 3:
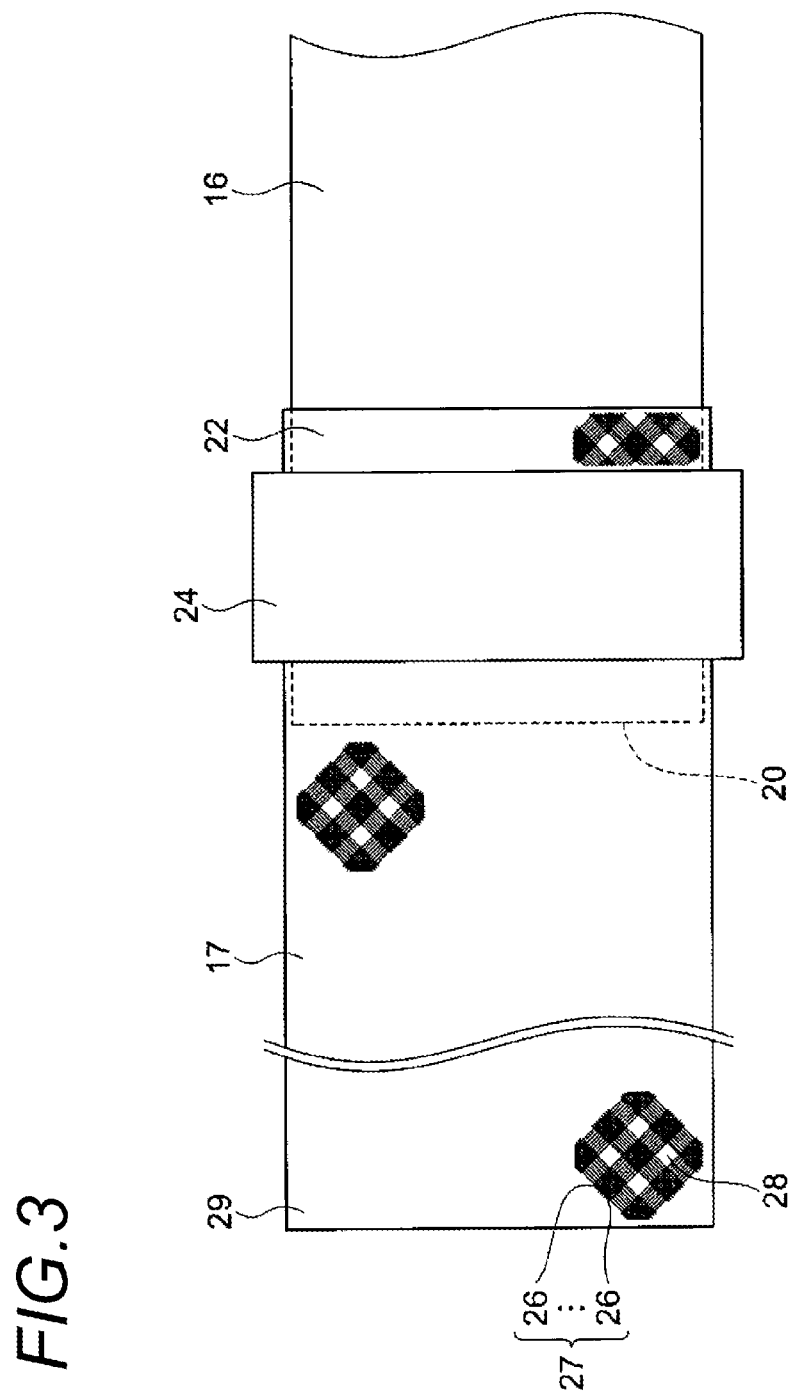
FIG. 3 is a plan view illustrating a state of an end portion of an exterior member before a braid is fixed.
Figure 4:
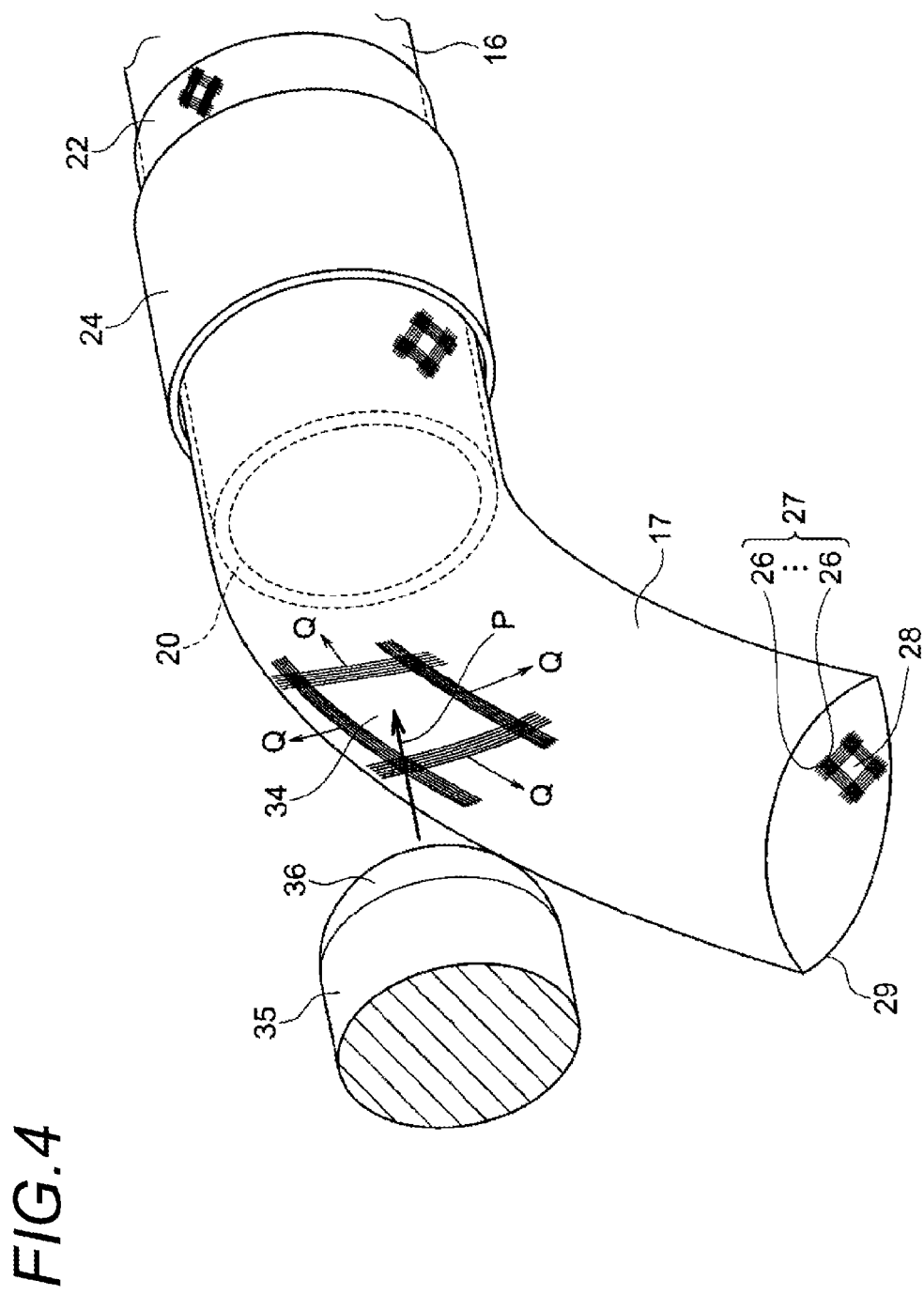
FIG. 4 is a perspective view illustrating when a core is inserted via a widely open braided mesh portion.
Figure 5:
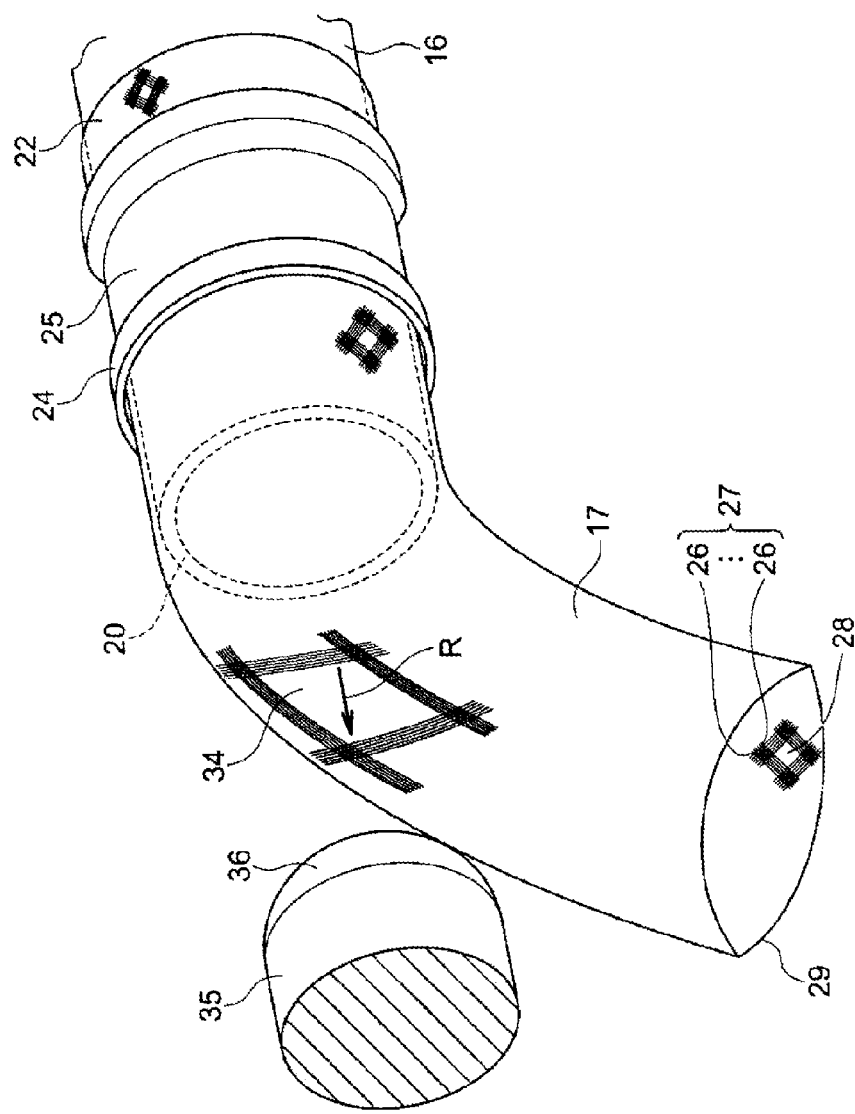
FIG. 5 is a perspective view illustrating a state in which crimping is performed and the core is removed.
Figure 6:
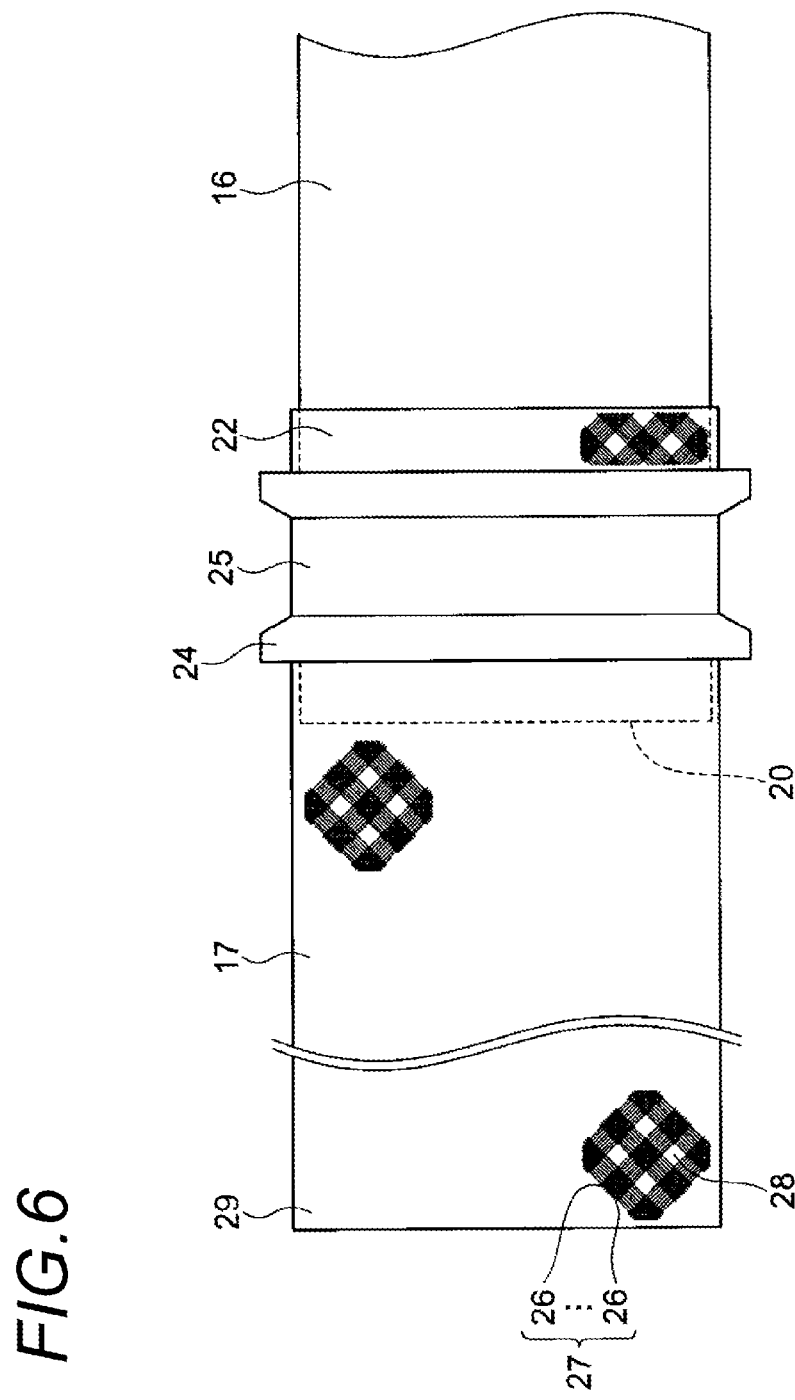
FIG. 6 is a plan view illustrating a state of the end portion of the exterior member after the braid is fixed.

Hereinafter, the wire harness and a production method therefor according to the embodiment will be described with reference to FIGS. 1 to 6. FIG. 1 is a schematic view illustrating routing of the wire harness according to the embodiment. FIG. 2 is a view of the configuration of the wire harness in FIG. 1. FIG. 3 is a plan view illustrating a state of an end portion of the exterior member before the braid is fixed. FIG. 4 is a perspective view illustrating when the core is inserted via the widely open braided mesh portion. FIG. 5 is a perspective view illustrating a state in which crimping is performed and the core is removed. FIG. 6 is a plan view illustrating a state of the end portion of the exterior member after the braid is fixed.

In the embodiment, the present invention is applied, as an example, to a wire harness that is routed in a hybrid vehicle (may be an electric vehicle or a typical vehicle).

In FIG. 1, reference number 1 indicates a hybrid vehicle. The hybrid vehicle 1 is a vehicle that is driven by the combination of two power sources such as an engine 2 and a motor unit 3. A battery 5 (in other words, battery pack) supplies electrical power to the motor unit 3 via an inverter unit 4. In the embodiment, the engine 2, the motor unit 3, and the inverter unit 4 are mounted in an engine compartment 6 close to front wheels and the like. The battery 5 is mounted in a vehicle rear portion 7 close to rear wheels and the like. The battery 5 may be mounted in the interior of vehicle which is positioned at the back of the engine compartment 6.

The motor unit 3 and the inverter unit 4 are electrically connected to each other via a high-tension wire harness 8. The battery 5 and the inverter unit 4 are also electrically connected to each other via a high-tension wire harness 9. A middle portion 10 of the wire harness 9 is routed on a vehicle floor 11. The wire harness 9 is routed along the vehicle floor 11 and in substantially parallel therewith. The vehicle floor 11 is a well-known body, and is formed of a so-called panel member, and a thru-hole (not illustrated) is formed at a predetermined position of the vehicle floor 11. The wire harness 9 is inserted through the thru-hole.

The wire harness 9 and the battery 5 are electrically connected to each other via a junction block 12 of the battery 5. A rear end 13 of the wire harness 9 is electrically connected to the junction block 12 using a well-known method. A front end 14 of the wire harness 9 is electrically connected to the inverter unit 4 using a well-known method.

The motor unit 3 includes a motor (not illustrated) and a generator (not illustrated). The inverter unit 4 has an inverter (not illustrated) and a converter (not illustrated). The motor unit 3 is formed as a motor assembly that includes a shielding case (not illustrated). The inverter unit 4 is also formed as an inverter assembly that includes a shielding case (not illustrated). The battery 5 is a Ni-MH battery or a Li-ion battery, and is formed into a module. In addition, it is also possible to use an electrical power storage device such as a capacitor. The battery 5 is not particularly limited to a specific form of battery insofar as the battery 5 can be used in the hybrid vehicle 1 or an electric vehicle.

First, the configuration and structure of the wire harness 9 will be described.

As described above, the wire harness 9 is a high-tension member for electrically connecting the inverter unit 4 to the battery 5. As illustrated in FIG. 2, the wire harness 9 includes conductive paths 15; an exterior member 16; a braid 17; an inverter-side connecting portion 18; and a battery-side connecting portion 19.

The following is adopted as conductive path 15: a high-tension electric wire that includes a conductor and an insulator; a cabtyre cable; a high-tension coaxial composite conductive path that has a set of positive and negative circuits; or the like. In addition, a high-tension conductive path can be also adopted as the conductive path 15, which is obtained by providing an insulator on a well-known bus bar. In the embodiment, a well-known high-tension electric wire is adopted as the conductive path 15 (refer to FIG. 2). In the embodiment, two conductive paths 15 which are high-tension electric wires are used. The number of conductive paths 15 in use is not limited to a specific number.

The conductor is made of copper, a copper alloy, aluminum, or an aluminum alloy. The conductor may have a structure in which wires are twisted together, or a structure having a bar shape which has a rectangular cross section or a round cross section (for example, a structure in which the conductor has a straight angle single core or a round single core, and in this case, the electric wire also has a bar shape). A high-tension electric wire is produced by extrusion-molding an insulator made of an insulating resin material on the outer surface of the conductor.

The exterior member 16 is a tubular metal body that accommodates and protects the conductive paths 15, and in the embodiment, the exterior member 16 is formed to have a circular cross section. In addition, the circular cross section is an example, and the exterior member 16 in use may be formed to have an elliptical cross section by pressing a circular tube. The exterior member 16 may have an oblong circular cross section, a rectangular cross section, or the like.

The exterior member 16 is formed to have a length according to the routing path of the wire harness 9. The exterior member 16 is formed to have a thickness required to protect the conductive paths 15. The exterior member 16 is formed to have a diameter required to allow the conductive paths 15 to be inserted therethrough and accommodated therein.

Since the exterior member 16 accommodates the conductive paths 15 which are high-tension electric wires, a portion of the outer surface of the exterior member 16 is used to notify that the conductive paths 15 are for high voltage electricity. In the embodiment, the outer surface of the exterior member 16 is painted orange so as to indicate that the conductive paths 15 are for high tension electricity.

As an example of the material of the exterior member 16, stainless steel is selected from the viewpoint of protective performance or weather resistance. As an example of the material of the exterior member 16, aluminum or an aluminum alloy may be also selected from the viewpoint of protective performance or weight reduction. In the embodiment, the exterior member 16 made of aluminum is adopted.

Add-on components (not illustrated) are attached to the outer surface of the exterior member 16. The following are examples of the add-on components: a clamp for attaching and fixing the wire harness 9 to the vehicle floor 11 (refer to FIG. 1); a grommet that is water tightly attached to the thru-hole in the vehicle floor 11; and the like.

A conductive path terminal portion 21 of each of the conductive paths 15 is pulled out of (led from) an end 20 of the exterior member 16 in a predetermined length. An end 22 of the braid 17 for shielding the conductive path terminal portions 21 from electromagnetic waves is fixed to the end 20. A terminal fitting 23 for electric connection is fixed to an end portion of the conductive path terminal portion 21, that is, the terminal of the conductive path 15.

As described above, the end 22 of the braid 17 is fixed to the end 20 of the exterior member 16. A crimp ring 24, which is thin and has an annular shape, is used for the fixing. The diameter of the crimp ring 24 is reduced via crimping, thereby the braid 17 is brought into a crimped state, and fixed to the exterior member 16. When the crimp ring 24 is subjected to crimping, a concave deformed portion 25 is formed in the crimp ring 24.

The braid 17 is formed to have a cylindrical shape by braiding bundles 27 of extra-thin metal strands 26 having conductivity, and many braided meshes 28 are formed in the braid 17. When the braiding is performed, the number of wires per carrier or the number of carriers in the braiding is arbitrarily determined. In the embodiment, the metal strands 26 in use are made of aluminum or an aluminum alloy so as to reduce weight. Aluminum or an aluminum alloy is an example of the material, and the metal strands 26 may include resin wires having conductivity.

The braid 17 is initially formed to have a long length, and is cut to have a predetermined length for use after the manufacturing. The braid 17 is formed to have a long total length relative to the dimension of an opening of the end 20 of the exterior member 16. That is, the braid 17 is formed to be a long braid. For example, as illustrated in FIG. 3, the braid has a long length, due to which the braid droops.

In the embodiment, the conductive path terminal portion 21 pulled out from the end 20 of the exterior member 16 is relatively long. For this reason, the braid 17 is also formed to have a long length.

The conductive paths 15 are collectively inserted into the braid 17. The other end 29 of the braid 17 is widely opened in conformity to the shape of each of the inverter-side connecting portion 18 and the battery-side connecting portion 19.

Each of the inverter-side connecting portion 18 and the battery-side connecting portion 19 includes a shielding shell 31 that has a cylindrical connecting portion 30; a crimp member 32 having a ring shape; the terminal fittings 23 which are respectively provided at the terminals of the conductive paths 15; and bolts (not illustrated) that fix the shielding shell 31 to the shielding case (not illustrated).

The shielding shell 31 is a metal-like structural body having conductivity, and has bolt fixing portions for allowing the bolts (not illustrated) to be inserted thereinto. The bolt fixing portions are disposed in alignment with the position of the shielding case. The shielding shell 31 is formed to have a shape by which the conductive paths 15 are allowed to pass through the shielding shell 31.

The cylindrical connecting portion 30 is disposed in such a manner that the conductive paths 15 are aligned with a portion of the cylindrical connecting portion 30, through which the conductive paths 15 pass. The cylindrical connecting portion 30 is a part of the shielding shell 31, is made of metal, has an annular shape, and is inserted into the other end 29 of the braid 17. The cylindrical connecting portion 30 includes a portion electrically connected to the other end 29 of the braid 17, and a portion that receives a crimping force when the crimp member 32 is subjected to crimping.

The crimp member 32 is a member that is inserted onto the outside of the other end 29 of the braid 17. The crimp member 32 is formed by machining a metal plate with a thickness suitable for the transformation of a shape into an annular shape. When the crimp member 32 is subjected to crimping, a plurality of deformed portions 33 which are concave near the braid 17 are formed in the crimp member 32. The deformed portion 33 may be the same as the deformed portion 25.

Subsequently, an operation of fixing the end 22 of the braid 17 to the end 20 of the exterior member 16 will be described with reference to FIGS. 3 to 6. Hereinafter, distinctive parts of a method for producing the wire harness 9 (refer to FIG. 2) will be described, and for example, a well-known method is adopted as the remainder of the method for producing the wire harness 9. Hereinafter, a mode by which an operator performs operations will be described, but the embodiment of the present invention is not limited to that mode. For example, in another mode, a part or the entirety of the operations may be performed by a machine.

During a first operation, as illustrated in FIG. 3, the operator inserts the end 20 of the exterior member 16 into the end 22 of the braid 17 (that is, the outside of the end 20 is covered with the end 22). During the following operation, the operator inserts the end 22 of the braid 17 into the crimp ring 24, so that the crimp ring 24 is disposed on the outside of the end 22. The end 22 of the braid 17 is disposed between the end 20 of the exterior member 16 and the crimp ring 24 via the first operation.

During a second operation, as illustrated in FIG. 4, the operator forms a widely open braided mesh portion 34 in the braid 17. During the following operation, the operator inserts a core 35 into the end 20 of the exterior member 16 from the outside of the braid 17 through the widely open braided mesh portion 34 (In FIG. 4, arrow P indicates an insertion direction). For example, the widely open braided mesh portion 34 is formed by widening a braided mesh 28 in a direction of arrow Q illustrated in FIG. 4, and the braided mesh 28 is close to the end 20 of the exterior member 16.

When the widely open braided mesh portion 34 is formed via the second operation, the core 35 can be inserted via the widely open braided mesh portion 34, and thereby the core 35 may not be inserted via the other end 29 of the braid 17. For this reason, the insertion distance of the core 35 decreases. Accordingly, workability in the insertion of the core 35 improves.

A convex portion 36 is preferably formed on an insertion side of the core 35. The hemispherical or cannonball-shaped convexity of the convex portion 36 is effective for inserting the core 35. Since the convex portion 36 is formed, the core 35 is smoothly inserted through the widely open braided mesh portion 34.

During a third operation, as illustrated in FIG. 5, the operator performs a crimping operation for the crimp ring 24. After the crimping operation is completed, the operator removes the core 35 from the inside of the end 20 of the exterior member 16 to the outside of the braid 17 via the widely open braided mesh portion 34 (In FIG. 5, arrow R indicates a removing direction.)

When the crimp ring 24 is subjected to crimping via the third operation, a concave deformed portion 25 is formed in the crimp ring 24. Accordingly, the end 22 of the braid 17 is fixed to the end 20 of the exterior member 16.

Since an opening of the widely open braided mesh portion 34 is secured by the insertion of the core 35 during the second operation, it is possible to smoothly remove the core 35 during the third operation.

During a fourth operation, as illustrated in FIG. 6, the operator restores the braid 17 into an original state, that is, restores the widely open braided mesh portion 34 (refer to FIGS. 4 and 5) into an original state of the braided mesh 28.

Accordingly, a series of the operations are completed, by which the end 22 of the braid 17 is fixed to the end 20 of the exterior member 16.

As can be understood from the description above, the method for producing the wire harness according to the embodiment includes a core inserting step (that is, the second operation) of forming the widely open braided mesh portion 34 by widening the braided mesh 28 of the braid 17, and of inserting the core 35 into the end 20 of the exterior member 16 from the outside of the braid 17 through the widely open braided mesh portion 34. For this reason, it is possible to improve workability in the insertion of the core 35 compared to the related art. In particular, it is possible to improve workability in the insertion of the core 35 in a case where the braid 17 is long.

In the description above, the present invention is applied to the wire harness 9, but is not limited to the wire harness 9. The present invention can be also applied to the wire harness 8.

Naturally, various modifications can be made to the present invention insofar as the modifications do not depart from the intent of the present invention.

The following is a summary of the wire harness according to the embodiment.

(1) A method for producing a wire harness according to the embodiment is a method for producing a wire harness 9, in which the wire harness 9 includes at least one conductive path 15; an exterior member 16, having a tubular shape, that accommodates and protects the conductive path 15; and a braid 17, having a cylindrical shape, that is fixed to an end 20 of the exterior member 16 via crimping, and covers a terminal portion of the conductive path (a conductive path terminal portion 21) which is externally led from the end 20. The method for producing the wire harness according to the embodiment includes a core inserting step of forming a widely open braided mesh portion 34 by widening a braided mesh 28 of the braid 17 before the crimping is performed, and inserting a core 35 inside the end 20 from an outside of the braid 17 through the widely open braided mesh portion 34.

(2) According to the method for producing the wire harness of the embodiment, the braid 17 is a long braid formed to have a long total length relative to an opening of the end 20 in dimension.

(3) According to the method for producing the wire harness of the embodiment, in the core insertion step, the widely open braided mesh portion 34 is formed by widening the braided mesh 28 close to the end 20.

(4) According to the method for producing the wire harness of the embodiment, during the core insertion step, an insertion side of the core 35, on which a convexity (convex portion 36) is formed, is inserted to the widely open braided mesh portion 34.

A method for producing a wire harness according to the present invention is effective in that it is possible to improve workability in the insertion of a core.

What is claimed is:

1. A method for producing a wire harness, wherein the wire harness includes at least one conductive path; an exterior member, having a tubular shape, that accommodates and protects the conductive path; said method comprising the steps of:
    providing a braid, having a cylindrical shape, that covers a terminal portion of the conductive path which is externally led from an end of the exterior member, the braid being formed out of a plurality of strands which define a plurality of braided meshes, the braided meshes being gaps between the strands;
    forming a widely open braided mesh portion by widening a one of the braided meshes of the braid;
    inserting a core inside the end of the exterior member from an outside of the braid and through the widely open braided mesh portion; and
    fixing the braid to the end of the exterior member by crimping a crimp ring onto the end of the exterior member inside which the core is inserted.

2. The method for producing the wire harness according to claim 1, further compromising forming the braid such that it is a long braid having a long total length relative to a dimension of an opening of the end of the exterior member.

3. The method for producing the wire harness according to claim 1, wherein, the widely open braided mesh portion is formed by widening the one of the braided meshes that is close to the end of the exterior member.

4. The method for producing the wire harness according to claim 1, wherein, the inserting of the core comprises inserting an insertion side of the core, on which a convexity is formed, into the widely open braided mesh portion.

5. The method for producing the wire harness according to claim 1, further comprising removing, after the crimping of the crimp ring, the core from the end of the exterior member to the outside of the braid via the widely open braided mesh portion.

* * * * *